US010387390B2

(12) United States Patent
Kim et al.

(10) Patent No.: US 10,387,390 B2
(45) Date of Patent: Aug. 20, 2019

(54) JUDGMENT QUALITY IN SBS EVALUATION

(71) Applicant: Microsoft Technology Licensing, LLC, Redmond, WA (US)

(72) Inventors: Jin Kim, Bellevue, WA (US); Imed Zitouni, Bellevue, WA (US); Rajesh Patel, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 882 days.

(21) Appl. No.: 14/839,169

(22) Filed: Aug. 28, 2015

(65) Prior Publication Data

US 2017/0060960 A1 Mar. 2, 2017

(51) Int. Cl.
*G06F 16/00* (2019.01)
*G06F 16/215* (2019.01)
*G06F 16/335* (2019.01)

(52) U.S. Cl.
CPC .......... *G06F 16/215* (2019.01); *G06F 16/335* (2019.01)

(58) Field of Classification Search
None
See application file for complete search history.

(56) References Cited

U.S. PATENT DOCUMENTS

| | | | | |
|---|---|---|---|---|
| 2006/0004891 | A1* | 1/2006 | Hurst-Hiller | ..... G06F 17/30646 |
| 2006/0064411 | A1* | 3/2006 | Gross | ................ G06F 17/30864 |
| 2010/0306224 | A1* | 12/2010 | Ciemiewicz | ...... G06F 17/30864 |
| | | | | 707/759 |

OTHER PUBLICATIONS

Ageev, M., Guo, Q., Lagun, D., and Agichtein, E. (2011). Find it if you can: a game for modeling different types of web search success using interaction data. *Proc. SIGIR*, 345-354.
Bailey, P., Craswell, N., White, R.W., Chen, L., Satyanarayana, A., and Tahaghoghi, S.M. (2010). Evaluating search systems using result page context. *Proc. symposium on Information interaction in context*, 105-114.
Carterette, B., Bennett, P., Chickering, D.M., and Dumais, S. (2008) Here or There: Preference Judgments for Relevance. *Proc. ECIR*, 16-27.
Fox, S., Karnawat, K., Mydland, M., Dumais, S.T., and White, T. (2005). Evaluating implicit measures to improve the search experience. *ACM TOIS*, 23(2), 147-168.
Hassan, A., Jones, R., and Klinkner, K.L. (2010). Beyond DCG: user behavior as a predictor of a successful search. In *Proc. WSDM*, 221-230.
Huffman, S. and M. Hochster, M. (2007). How well does result relevance predict session satisfaction? *Proc. SIGIR*, 567-574.
Joachims, T. (2002). Evaluating search engines using clickthrough data. Technical Report, Cornell University.

(Continued)

*Primary Examiner* — Belix M Ortiz Ditren

(57) ABSTRACT

Examples of the present disclosure describe systems and methods for using online signals to improve judgment quality in Side-by-Side (SBS) evaluation. In aspects, two or more search result lists may be accessed within a query log. The search result lists may be used to generate and/or determine satisfaction metrics between the search result lists. The satisfaction metrics may be aggregated to automatically generate preference judgments for the search result lists. In some aspects, the preference judgments may be compared to the preference judgments of judges to measure the judgment quality of the judges.

20 Claims, 10 Drawing Sheets

(56) References Cited

OTHER PUBLICATIONS

Radlinski, F., Kurup, M. and Joachims, T. (2008). How Does Clickthrough Data Reflect Retrieval Quality. *Proc. CIKM*, 43-52.
Sanderson, M., Paramita, M., Clough, P. and Kanoulas, E. (2010) Do user preferences and evaluation measures line up? *Proc. SIGIR*, 555-562.
Thomas, P. and Hawking, D. (2006). Evaluation by comparing result sets in context. *Proc. CIKM*, 94-101.

\* cited by examiner

JUDGMENT QUALITY IN SBS EVALUATION

BACKGROUND

Information retrieval (IR) is the process of obtaining relevant resources from a collection of information sources. Automated IR systems, such as web search engines, are often used to process user queries for resources (e.g., web pages, documents, etc.). Traditionally, IR systems have been evaluated in terms of the relevance of the resource result sets retrieved for individual queries. Recent research, however, has improved this evaluation by exploring the preference judgments for resources retrieved for multiple resource result sets for the same or similar user queries, referred to as Side-by-Side (SBS) evaluation. Currently, SBS evaluation requires a substantial resource investment and highly-trained and/or consistently-monitored judges to produce accurate results.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for using online signals to improve judgment quality in Side-by-Side (SBS) evaluation. In aspects, two or more search result lists may be accessed within a query log. The search result lists may be used to generate and/or determine satisfaction metrics and/or dissatisfaction metrics between the search result lists. The metrics may be aggregated to automatically generate preference judgments for the search result lists. In some aspects, the preference judgments may be compared to the preference judgments of judges to measure the judgment quality of the judges. In other aspects, the preference judgments may be provided as hints to the judges to improve the judgment quality and timeliness of the judge's judgments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
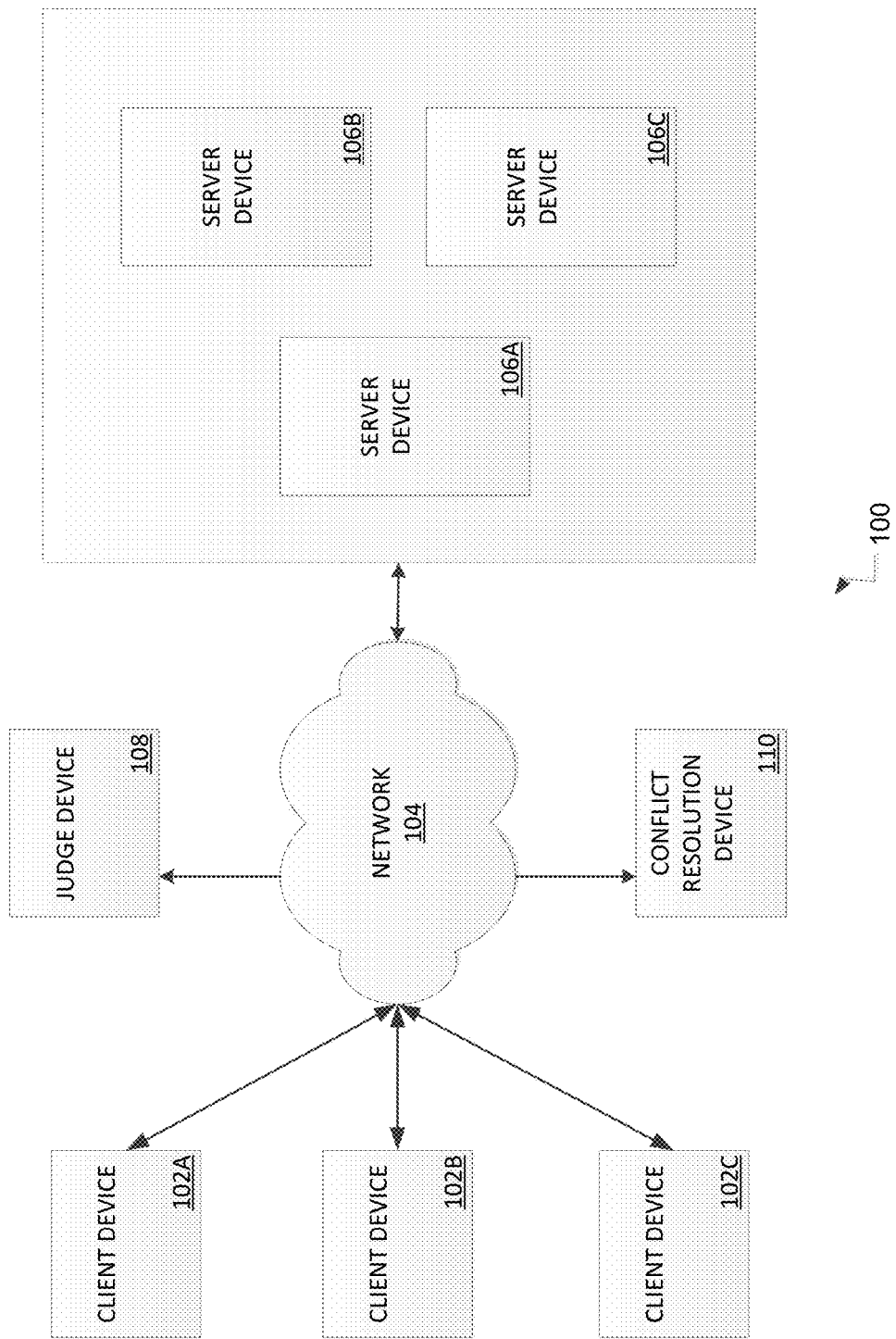
FIG. 1 illustrates an overview of an example system for using online signals to improve judgment quality in SBS evaluation as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for using online signals to improve judgment quality in Side-by-Side (SBS) evaluation. SBS evaluation, as used herein, may refer to comparing two or more lists to determine, for example, user preferences between the lists. For example, the lists may comprise search result for queries submitted to: a search engine, a database system, a text search utility, or a file system search utility. Although such lists are not limited to comprising query results (e.g., lists may alternately or additionally comprise comparative data, such as ratings, reviews, classifications, comments, etc.), examples herein are described with reference to query results for clarity of explanation. In aspects, a processing device may receive two or more queries for the same or similar content. In examples, the processing device may use a term matching utility or component to identify queries having similar content. In a particular example, the term matching utility may use an algorithm to locate terms that, for example, share more than a threshold value (e.g., 95%) of characters in a particular sequence. The processing device may generate or retrieve result lists for the queries, and may store the queries, data associated with the queries (e.g., online signals) and/or the result lists in a data repository. Online signals, as used herein, may refer to session and/or behavior information (e.g., mouse movements, clicks, scrolls, hovers, keystrokes, etc.) that is associated with the generation of a list or the navigation of a screen. A data repository, as used herein, may refer to a destination designated for data storage, such as a database, a (e.g., query) log file, etc.

The processing device may use the query log data to generate and/or determine satisfaction values and/or dissatisfaction metrics for the search result lists. A satisfaction value, as used herein, may refer to a value associated with a user selection (e.g., a click, a visit to a web page, execution of an application, etc.) of a result in the search result list, where the selection results in a dwell time that is above a predefined threshold. A dissatisfaction value, as used herein, may refer to a value associated with a user selection of a result in the search result list, where the selection results in a dwell time that is below a predefined threshold. A dissatisfaction value may also refer to a value associated with the reformulation of a query in response to the generation and/or presentation of a search result list. A dwell time, as used herein, may refer to the amount of time a user spends on one or more activities. For example, dwell time may indicate the amount of time: spent on a web page that is presented in response to a click on a search result, executing an application, viewing a file, etc. A dwell time above the predefined threshold may indicate that the user is satisfied with the search result. The processing device may aggregate (or cause the aggregation of) query log data and/or satisfaction values for one or more queries, and the aggregated data may be used to generate one or more automated preference judgments. A preference judgment, as used herein, may refer to a decision that a first piece or set of data is more relevant, correct and/or accurate than a second piece or set of data. For example, a first result list (or one or more documents in the first result list) may be determined to be more relevant to a query and/or satisfactory to a user than a second result list (or one or more documents in the second result list). As another example, a data structure comprising a first comment about a topic (e.g., a product, service, etc.) may be determined to offer a more comprehensive analysis of the topic (and, thus, be more accurate) than a second comment located in the same (or in a different) data structure. In such as example, a preference judgment may be made for the first comment.

In some aspects, the query log data, satisfaction values and/or aggregated data may be provided to a judge. A judge, as used herein, may refer to a device that makes determinations about one or more aspects of data. In one example, the judge may make a determination about one or more search lists based on information received from a user via a UI or API associated with the processing device. In another example, the judge may make a determination about one or more search lists based on heuristics, statistical models, an algorithm, etc. associated with a processing device. The judge may use the provided information to generate judged preference judgments.

The judged preference judgments may be evaluated against the automated preference judgments. For example, the processing device may use an algorithm or analysis component to perform analysis of the two sets of preference judgments (e.g., judged and automated) to determine matches or consistencies. If the judged preference judgments are determined to be the same as (or are substantially consistent with) the automated preference judgments, the two sets of preference judgments may be consolidated into a set of approved preference judgments. In examples, the approved preference judgments may be used to monitor the performance and/or judgment of the judges. If the judged preference judgments are not the same as (or are not substantially consistent with) the automated preference judgments, the preference judgments may be transmitted to a conflict resolution device. A conflict resolution device, as used herein, may refer to a device having special or expert knowledge or skills in a particular area or topic, a statistical model, trusted results from an algorithm, etc. In one example, the conflict resolution device may choose between the automated preference judgment(s) and the judged preference judgment(s) based on information received from a user via a UI or API associated with the processing device.

The conflict resolution device may evaluate the automated preference judgments and the judged preference judgments to determine which set of judgments is most and/or least relevant to the query based on information received from a user via a UI or API associated with the processing device. This evaluation may result in generating a set of resolved preference judgments. Alternately, the conflict resolution device may be transmitted the query log data, satisfaction values and/or aggregated data in addition to, or instead of, the judged preference judgments and the automated preference judgments. In such an example, the conflict resolution device may evaluate the received information to independently establish a set of resolved preference judgments. In examples, the resolved preference judgments may be used to monitor the performance and/or judgment of the judges.

In other aspects, automated preference judgments may be provided to the judge. In some examples, the automated preference judgments may be provided to the judge before the judge begins analyzing the query log data, satisfaction values and/or aggregated data. The judge may then use the automated preference judgments to inform decisions while generating the judged preference judgments. In other examples, the automated preference judgments may be provided to the judge as hints or feedback while the judge is generating judged preference judgments. In other examples, the automated preference judgments may be provided to the judge after the judged preference judgments are generated in order for the judge to validate or reconsider the judged preference judgments. In such aspects, the judged preference judgments may result in a consolidated set of feedback-assisted preference judgments.

Accordingly, the present disclosure provides a plurality of technical benefits including but not limited to: automatically providing preference judgments for search results lists; monitoring the quality of judges; providing tools to increase the accuracy of IR evaluations and the time requirements to provide preference judgments; measuring similarities between user behavior; reducing annotation costs of SBS evaluation; reducing the amount of additional queries or requests that are received in order to identify a correct result; reduction in the number of requests that must be transmitted over a network; the optimization and transformation of data into results sets; and identifying spammers, among other examples.

FIG. 1 illustrates an overview of an example system for using online signals to improve judgment quality in SBS evaluation as described herein. Exemplary system 100 presented is a combination of interdependent components that interact to form an integrated whole for improving recommendations from implicit feedback. Components of the systems may be hardware components or software implemented on and/or executed by hardware components of the systems. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the exemplary operating environments depicted in FIGS. 7-9. In other examples, the components of systems disclosed herein may be spread across multiple devices. For instance, input may be entered on a client device and information may be processed or accessed from other devices in a network, such as one or more server devices.

As one example, the system 100 may comprise client device 102A, client device 102B, client device 102C, distributed network 104, a distributed server environment comprising one or more servers such as server device 106A, server device 106B and server device 106C, judge device 108 and conflict resolution device 110. One of skill in the art will appreciate that the scale of systems such as system 100 may vary and may include more or fewer components (e.g., devices) than those described in FIG. 1. In some examples, interfacing between components of the system 100 may occur remotely, where for example software and/or processes of system 100 may be spread across one or more devices of a distributed network.

In aspects, client computing device 102A, for example, may be configured to generate a statement or query for resources from a data processing system (e.g., an information retrieval (IR) system). Client device 102A may also be configured to transmit the query to one or more of servers 106A, 106B and 106C via network 104. Server device 106A, for example, may be configured to receive and process the query. In aspects, processing the query may comprise generating a result set for the query or retrieving a result set for the query from, for example, server devices 106B and/or 106C via network 104 or some other communication channel. Processing the query may further comprise storing data associated with the query and/or the result lists in, for example, a query log. In one example, the query log may comprise the query, identifying information about the computing device and/or a user or user profile associated with the computing device that generated the query, information and statistics associated with the query, one or more result lists, and/or information and statistics associated with the one or more result lists. Server device 106A may also be configured to evaluate the log data and to generate preference judgments. In some examples, evaluating the log data may comprise determining a query or query term to analyze, identifying one or more associated result sets, and determining or generating satisfaction metrics (e.g., satisfaction values and dissatisfaction values) for the result sets. The satisfaction metrics may be used to generate automatic preference judgments for the result sets.

In some aspects, the automatic preference judgments and/or the query log data may be transmitted to a judge device 108. The judge device 108 may analyze the received information to generate judged preference judgments for the search result lists. The judged preference judgments and/or information associated with the judged preference judgments may be transmitted to server device 106A. In alternate aspects, judge device 108 may access server device 106A from, for example, a user interface (UI) or application programming interface (API) accessible to judge device 108. The user interface or API may provide judge device 108 with access to the automatic preference judgments and/or the query log data. The judge device 108 may use such information to generate judged preference judgments.

In some examples, server device 106A may create and store a set of consolidated preference judgments using the judged preference judgments. In other examples, server device 106A may evaluate the automatic preference judgments against the judged preference judgments. If the judged preference judgments are the same as (or are substantially consistent with) the automated preference judgments, a set of approved preference judgments may be generated from the two sets of preference judgments (e.g., judged and automated). If the judged preference judgments are not the same as (or are not substantially consistent with) the automated preference judgments, the two sets of preference judgments and/or information associated with the two sets of preference judgments may be transmitted to conflict resolution device 110. In some aspects, conflict resolution device 110 may analyze the received information to determine a most and/or least relevant set of resolved preference judgments for the search result lists. The resolved preference judgments and/or information associated with the resolved preference judgments may be transmitted to server device 106A. In alternate aspects, conflict resolution device 110 may access server device 106A via a user interface or an API accessible to conflict resolution device 110. The user interface or API may provide conflict resolution device 110 with access to the automatic preference judgments, the judged preference judgments and/or the query log data. In examples, server device 106A may track and store the performance of judges using the automatic preference judgments, the judged preference judgments, the resolved preference judgments and/or the query log data.

Figure 2:
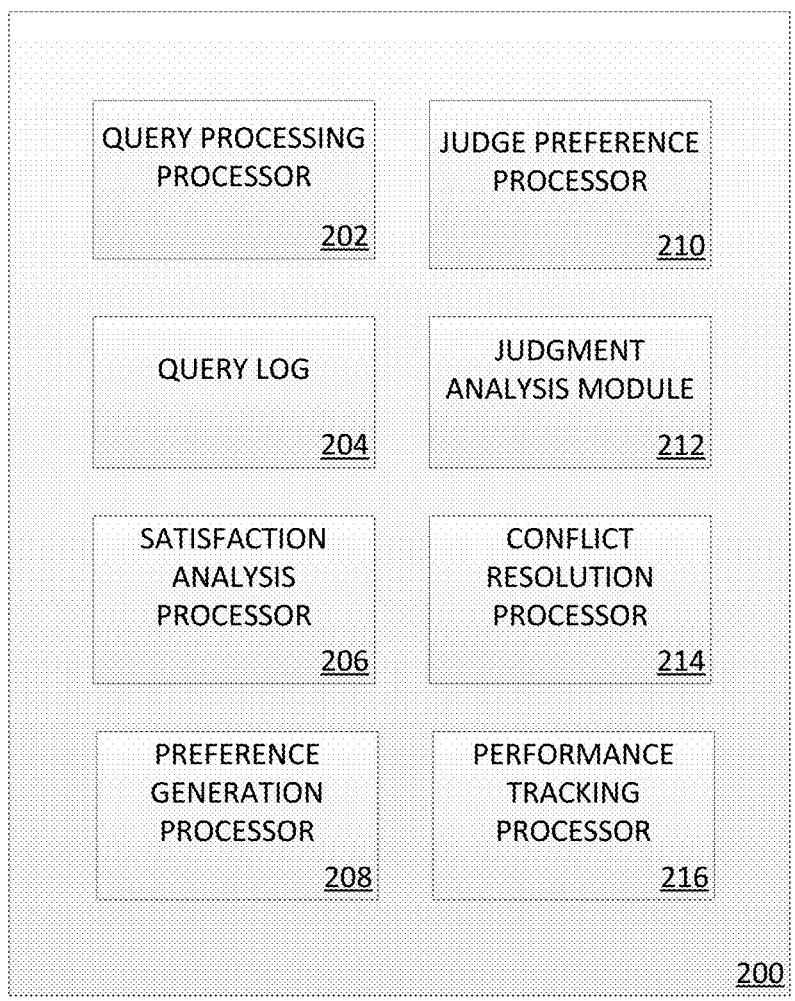
FIG. 2 illustrates an overview of an example input processing unit for using online signals to improve judgment quality in SBS evaluation as described herein.

FIG. 2 illustrates an overview of an example input processing unit 200 for using online signals to improve judgment quality in SBS evaluation as described herein. The SBS evaluation techniques implemented by input processing unit 200 may comprise the SBS evaluation techniques and input described in FIG. 1. In alternative examples, a single system (comprising one or more components such as processor and/or memory) may perform processing described in systems 100 and 200, respectively. Further, input processing unit 200 may comprise a user interface component as described in the description of FIG. 1.

Exemplary input processing unit 200 may comprise query processing processor 202, query log 204, satisfaction analysis processor 206, preference generation processor 208 and judgment analysis processor 210. A processor, as used herein, may refer to electronic circuitry within a computing device or to a set of executable instructions that are capable of execution by the electronic circuitry. In aspects, as described with respect to operations 302 and 304, query processing processor 202 may be configured to receive query data from a client device via, for example, an API exposed to the client device. In a particular example, query processing processor 202 may be configured to receive query data directly from a user via a user interface. The data may be stored in a buffer and accessed by one or more applications/programs associated with input processing unit 200. The query data may be associated with a request for resources from a data processing system (e.g., an IR system). Query processing processor 202 may be further configured to generate a result set for the query data or to retrieve a result set for the query data from an accessible computing device. In an example, query processing processor 202 may access a buffer storing the query data, establish a data connection (e.g., using transmission control protocol (TCP), inter-process communication (IPC), etc.) to a data processing system, and transmit the query data to the data processing system using the data connection. Query processing processor 202 may receive on or more result sets from the data processing unit using the data connection and may store the query data and/or result set in, for example, query log 204 using IPC.

Query log 204 may be configured to capture and/or store information associated with queries received and/or processed by input processing unit 200. In aspects, query log 204 may be a persistent (or semi-persistent) document and may be stored in a document storage system accessible to input processing unit 200. Query log 204 may comprise, for example, query data, identifying information about the user and/or computing device that generated the query data, information and statistics associated with the query data, one or more result lists, and/or information and statistics associated with the one or more result lists.

Satisfaction analysis processor 206 may be configured to generate satisfaction values for one or more result sets in query log 204. In aspects, satisfaction analysis processor 206 may analyze query log 204 to identify query data and/or result sets associated with particular queries. The query data may be used generate a satisfaction value for each of the queries. For example, the dwell time recorded for a clicked web result may be compared against a predetermined threshold to determine whether a user was satisfied by the web result. In another example, the order in which the web results are selected (or not selected) and the dwell time for each selection may be used as inputs to an algorithm to determine satisfaction values for one or more selected web results. In yet another example, the position of a result within a set of results, the order in which the result is selected (or not selected), and a dwell time of a selected web result may be provided as inputs to a statistical model that calculates and/or generates satisfaction values. The statistical value(s) may be increased, decreased or otherwise devalued based on the inputs and/or one or more input weighting criteria. For example, a satisfaction value for a result that is positioned lower in a result set may be reduced logarithmically proportional to the position of the result in the result set. In some aspects, satisfaction analysis processor 206 may receive the satisfaction value(s) from a statistical model or algorithm via IPC and store the satisfaction value(s) in a buffer.

Satisfaction analysis processor 206 may perform an entry to query log 204. The entry may identify whether the user was determined to be satisfied by the web result or a satisfaction value associated with the result. In a particular example, satisfaction analysis processor 206 may append a '1' to a line of the query log that corresponds to a query when a user is determined to be satisfied with the result set, and may append a '0' to a line of the query log that corresponds to the query when a user is determined not to be satisfied with the result set. In another example, satisfaction analysis processor 206 may assign a '0.95' to a selected result in the query log appearing as the first of five results in a result set, and a '0.25' to a selected result appearing as the fifth of five results in the result set. Alternately, satisfaction analysis processor 206 may record the satisfaction value(s) in a separate storage location and simply link or associate the satisfaction value with the query log.

Preference generation processor 208 may be configured to aggregate (or cause the aggregation of) at least some of the satisfaction values generated by satisfaction analysis processor 206. In aspects, preference generation processor 208 may access query log 204 to identify a particular query and result sets recorded for the query. Preference generation processor 208 may identify the query by using an algorithm, a statistical mode, or input from a client device. For example, preference generation processor 208 may use a statistical model to parse query log 204 and identify a trending query. The result sets associated with the identified query may also be identified by the statistical model or by a search utility. The output from the algorithm or statistical mode may be provided to the preference generation processor 208. In another example, a query having 100 individual entries (each entry including a 'Top 5' result set) in a query log may be associated with three unique result sets. Preference generation processor 208 may aggregate the result sets of the 100 individual entries into the three unique result sets groups, generate the count of entries in each result set group, and generate the count and/or percentage of the satisfaction values associated with the 100 individual entries for each result set group. In some examples, preference generation processor 208 may record this information in query log 204. In other examples, preference generation processor 208 may record this information in a separate storage location.

In aspects, after aggregating the results sets group data (e.g., result sets groups, result sets group counts and/or satisfaction data, etc.), preference generation processor 208 may identify the result set group having the most and/or least relevance to the query data. In examples, preference generation processor 208 may determine the relevance of a result set group using the associated satisfaction data. For example, preference generation processor 208 may compare satisfaction values associated with two or more result sets in a result set group, such that the result set with the highest satisfaction value is determined to be the most relevant result set in the result set group. In another example, preference generation processor 208 may compare satisfaction values and additional information (e.g., the number of client devices receiving the result list, the difference between the satisfaction values, etc.) associated with two or more result sets in a result set group.

In some aspects, preference generation processor 208 may determine whether the difference in relevance between the examined result set groups is statistically significant. For example, preference generation processor 208 may further identify two or more rankings that illustrate significant differences in key metrics, such as satisfaction metrics. In a particular example, preference generation processor 208 may use two-sample t-tests to identify the two or more rankings. A two-sample t-test, as used herein, may refer to a technique of statistical analysis using hypothesis tests to determine if two population means are equal. In such an example, if significant differences are found in the key metrics of the result set groups, the result set group determined to be the most relevant may be labeled and/or selected as the preferred result set for the query data (e.g., automated preference judgments). If significant differences are found in the key metrics of the result set groups, preference generation processor 208 may perform additional analysis before determining a preferred result set or may simply not label and/or select a preferred result set.

Judge preference processor 210 may be configured to make query data and/or results sets group data available to one or more judge devices. In aspects, judge preference processor 210 may receive such information from preference generation processor 208. The information may be made available via an API or a user interface of input processing unit 200, or by transmitting the information to a separate input processing unit, such as a judge device. In some aspects, judge preference processor 210 may additionally receive automated preference judgments from preference generation processor 208. In examples, the judge device(s) may use such information to generate judge preference judgments. In a particular example, the judge device(s) may use the information as inputs to an algorithm or statistical model. The algorithm or statistical model may compare satisfaction values associated with two or more result sets in a result set group, such that the result set with the highest satisfaction value is determined to be the most relevant result set in the result set group. The outputs that from the algorithm or statistical model may comprise judgments (e.g., judged preference judgments) about one or more result sets and may be provided to judge preference processor 210.

Judgment analysis processor 212 may be configured to compare aspects of two or more statistical models. For example, judgment analysis processor 212 may determine whether the output from preference generation processor 208 (e.g., automated preference judgments) and the output from judge preference processor 210 (e.g., judged preference judgments) are the same. In aspects, judgment analysis processor 212 may receive output from one or more of preference generation processor 208 and judge preference processor 210. Judgment analysis processor 212 may analyze whether the preference generation processor 208 output (e.g., automated preference judgments) are the same as (or are substantially consistent with) the judge preference processor 210 output (e.g., judged preference judgments). For example, judgment analysis processor 212 may analyze whether a number or percentage of matches between the automated preference judgments and judged preference judgments exceeds a predetermined threshold. If the number or percentage of matches exceeds the threshold, a consolidated set of approved preference judgments may be generated or confirmed. If the number or percentage of matches does not exceed the threshold, additional analysis may be performed on the data.

In another example, judgment analysis processor 212 may analyze whether the entirety of the output of preference generation processor 208 is equivalent to the entirety of the output from judge preference processor 210. If the two sets of output are determined to be equivalent, a consolidated set of approved preference judgments may be generated. In yet another example, judgment analysis processor 212 may evaluate a statistical model that has been trained using as input the output from preference generation processor 208 and output from judge preference processor 210. If the output of the statistical model (e.g., result sets or result group rankings) after training the model using the first set of input is equivalent to the output of the statistical model after training the model using the second set of output, a consolidated set of approved preference judgments may be generated. In still another example, a value (e.g., a checksum value, a document size value, etc.) representing the data within a document comprising the output from preference generation processor 208 may be compared to a value representing the data within a document comprising the output from judge preference processor 210. If the values are equivalent, a consolidated set of approved preference judgments may be generated. If the values are not equivalent, the output may be discarded or regenerated by preference generation processor 208 and judge preference processor 210.

Conflict resolution processor 214 may be configured to make query data, results sets group data, automated preference judgments and judged preference judgments available to one or more judge devices. In aspects, conflict resolution processor 214 may receive such information from one or more other components of processing unit 200. The information may be made available via an API or a user interface of input processing unit 200, or by transmitting the information to a separate input processing unit. In response to conflict resolution processor 214 accessing and/or evaluating the received information, resolved preference judgments may be received from conflict resolution processor 214. In some examples, conflict resolution processor 214 may generate a new set of preference judgments that supersede the judgments in both the automated preference judgments and the judged preference judgments. In other examples, conflict resolution processor 214 may simply select between the automated preference judgments and the judged preference judgments. In aspects, the preference judgments generated or selected by conflict resolution processor 214 (e.g., resolved preference judgments) may represent the most relevant and/or accurate result set for the query data.

Performance tracking processor 216 may be configured to track and/or monitor the performance of judge devices. In aspects, performance tracking processor 216 may receive information associated with the judge device(s) and the judged preference judgments from one or more components of input processing unit 200. For example, performance tracking processor 216 may record the number or percentage of matches between the judged preference judgments and the automated preference judgments and/or resolved preference judgments. If the number of matches is above a threshold value (e.g., 90%) for a particular judge device, a performance value may be assigned to or generated for the judge device. The performance value may or may not be accessible by the judge device. As another example, performance tracking processor 216 may record an assessment by conflict resolution processor 214 as to the competence of the judge device. For instance, conflict resolution processor 214 may determine that a judge device is: lacking the technical ability to perform certain tasks; untimely in performing certain tasks; completing tasks too quickly to perform adequate analysis; inconsistent in judgement when performing similar tasks; or an expert or especially qualified for a task.

As another example, performance tracking processor 216 may record historical preference judgment statistics for one or more judges. For example, performance tracking processor 216 may track the proficiency of a judge device across several technical, scientific, etc. areas using preference judgment statistics accumulated over a time period. In a particular example, performance tracking processor 216 may be able to determine: whether a judge device is gaining or losing knowledge of a technical area over time (e.g., whether a judge device is staying current in a particular field); daily or weekly trends in performance (e.g., the judge device records better performance in the evening than in the morning; inconsistencies in performance (e.g., the judge device appears to be accepting input from different users at different times); etc. As yet another example, performance tracking processor 216 may record the timeliness of the judged preference judgments. For example, performance tracking processor 216 may track the amount of time required for the judge device to complete tasks. The information may then be compared against other judge devices to determine a timeliness ranking. In a particular example, the amount of time used by the judge device to generate preferences may be used to determine the expertise of the judge device in various technical/scientific areas. In aspects, performance tracking processor 216 may be further configured to determine the quality, the technical strengths and/or weaknesses, the experience, and/or biases recorded by a judge device. In such aspects, this recorded data may dictate the compensation and/or continued participation of the judge device(s).

FIG. 3-6 illustrate various process flows associated with using data (e.g., online signals) to improve judgment quality in SBS evaluation as described herein. In aspects, methods 300-600 may be executed by an exemplary system such as system 100 of FIG. 1. In examples, methods 300-600 may be executed on a device comprising at least one processor configured to store and execute operations, programs or instructions. However, methods 300-600 are not limited to such examples. In other examples, methods 300-600 may be performed on an application or service for providing improved judgment quality in SBS evaluation. In at least one example, methods 300-600 may be executed by one or more components of a distributed network. For instance, a web service/distributed network service (e.g. cloud service) may be used to leverage the system described herein.

Figure 3:
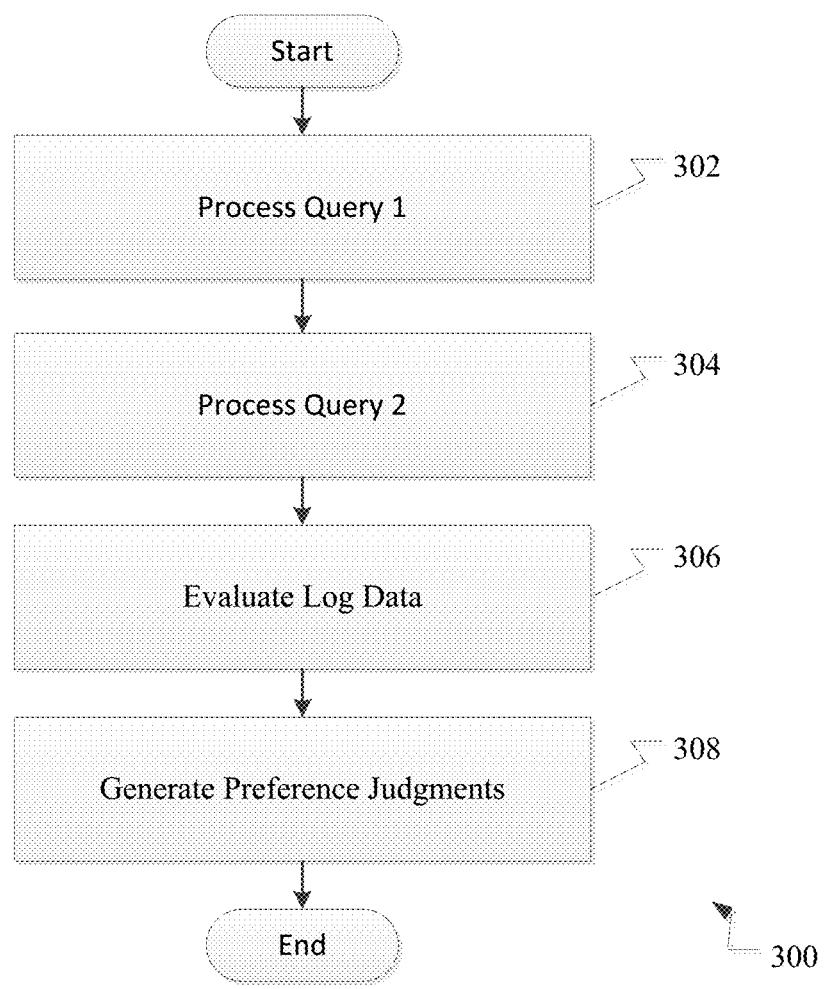
FIG. 3 illustrates an example method of using online signals to improve judgment quality in SBS evaluation as described herein.

FIG. 3 illustrates an example method 300 of using online signals to improve judgment quality in SBS evaluation as described herein. At operation 302, a first query may be processed by an input processing device. In aspects, the first query may include a request for resources from an IR system. For example, a query for "facebook.com" may be entered into a search engine. The first query may be received from a remote computing device via an exposed API or from a user interface on the input processing device. The remote computing device may also provide information about the user session and identifying information about the remote computing device and the user of the remote computing device (e.g., online signals). The user session information may comprise, for example, the duration of the session, the dwell time on a web result, the user click and hover data, etc. The identifying information may comprise, for example, username, device IP address, device MAC address, etc. In aspects, the input processing device may generate a result list or retrieve a result list from a remote computing device. The result list may comprise, for example, one or more uniform resource locators (URLs) to resources and/or metadata associated with the resources. Input processing device may transmit the result list to client device and may log the query, result set, and remote computing device information to a query or traffic log, or to an alternate storage location (e.g., log data).

At operation 304, a second query may be processed by an input processing device. In aspects, the second query may be processed by the same input processing device that processed the first query, and may include a similar request for resources from an IR system. For example, the second query may also be for "facebook.com" and may be received from a remote computing device. The remote computing device may also provide information about the user session and identifying information about the remote computing device and the user of the remote computing device. In aspects, the input processing device may generate a result list or retrieve a result list from a remote computing device and transmit the result list to the client device. Additionally, the input processing device may log the second query, result set, and remote computing device information as described above. Although FIG. 3 illustrates only two queries being processed in operations 302 and 304, it is contemplated that any number of queries may be processed before proceeding to operation 306. Additionally, it is contemplated that method 300 may be performed repeatedly to generate and regenerate/update preference judgements.

At operation 306, an input processing device may evaluate the log data. In aspects, evaluating the log data includes searching the log data for one or more queries or terms. For example, the input processing device may search the log data for the query "facebook.com." Result sets and other data may be identified and/or retrieved for each entry in the log data corresponding to the searched queries or terms. In some examples, the results sets may be different for the same or similar queries or terms. Such differences may occur due to, for example, experimentations being conducted by the IR system provider or the natural instability in search results. Satisfaction metrics may be determined for the identified data. In some aspects, one or more satisfaction metrics may be generated for each query in a result set. In a particular example, the satisfaction metric may be 'SAT-click,' which may be obtained when a click on a search result exceeding a predefined dwell time (e.g., 30 seconds) is observed. In a another example, the satisfaction metric may be 'DSAT' signal, which may be obtained when a click on a search result does not exceed a predefined dwell time (e.g., 30 seconds). In other aspects, one or more satisfaction metrics may be generated for each query in the log data as part of the query processing of operations 302 and 304.

At operation 308, preference judgments may be generated. In aspects, the input processing device may use the satisfaction metrics generated in operation 306 to determine a preference for a result set over another result set. In some examples, these judgments of preference (e.g., preference judgments) may be generated by aggregating the satisfaction metrics. For example, the log data for the query "microsoft.com" may comprise one or more unique result sets. The unique result sets may be grouped accordingly and counts and satisfaction metrics may be generated for the groups. In a particular example, three unique result sets may be grouped such that one group (e.g., group 1) has a 100 entries in the log data (e.g., count=100) and 75 SAT-click for those entries, one group (e.g., group 2) has a 100 entries in the log data and 50 SAT-click for those entries, and one group (e.g., group 3) has a 100 entries in the log data and 25 SAT-click for those entries. As the percentage of SAT-clicks per entry is highest in group 1 (e.g., 75% of entries included SAT-clicks) and lowest in group 3 (25% of entries included SAT-clicks), a preference judgment may be determined for group 1 such that group 1 is preferred over group 2 and group 2 is preferred over group 3.

Figure 4:
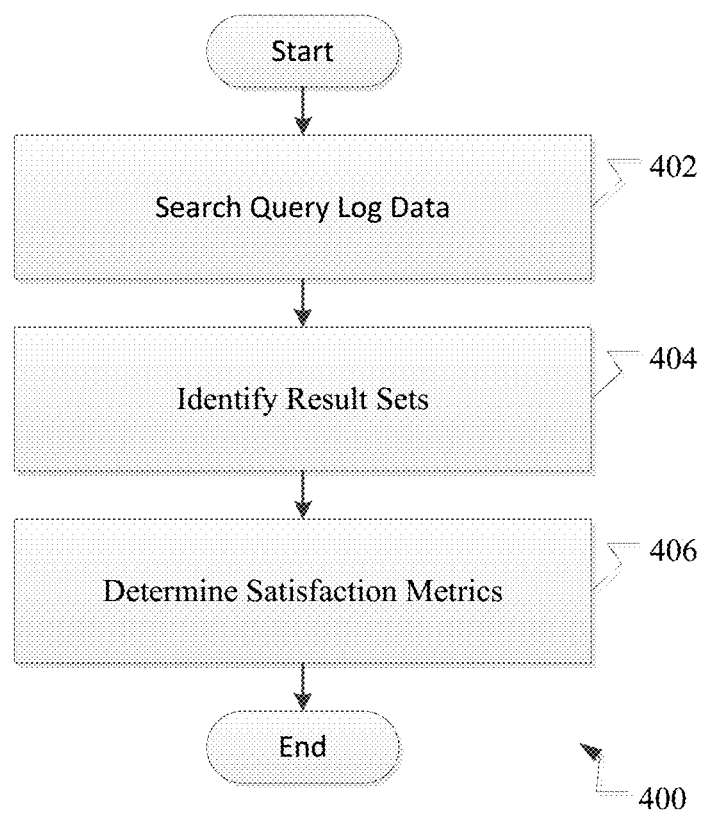
FIG. 4 illustrates an example method of evaluating log data as described herein.

FIG. 4 illustrates an example method 400 of evaluating log data as described herein. At operation 402, a log (as described above) may be searched for log data pertaining to one or more queries. For example, log data may comprise several thousand entries. Each entry may be represented as a row in the log data. Each row may comprise at least a query and one or more resources or resource indicators related to the query (e.g., the top 3 URLs). In aspects, a query may be searched in the log data based on one or more determinations. For example, an input processing unit may analyze the log data periodically to determine the query or queries having the largest amount of entries. In another example, an input processing unit may analyze the log data to determine which queries are trending or declining over a certain period. In yet another example, a user may select the query or queries via a user interface (UI). In such examples, the determined queries may become the subject of the log data search.

At operation 404, result sets are identified in the log data. In aspects, a query may be associated with one or more result sets, such that performing a log data search for the query may identify all or a portion of the result sets. In a particular example, the log data search may indicate 250 entries for the query "microsoft.com." Each of the 250 entries may be associated with a result set that comprises, for example, the "Top 3" results. Of the 250 entries, there may be three unique result sets of "Top 3" URLs. Such results may be represented in the below Table 1.

TABLE 1

| Query | URL1 | URL2 | URL3 | UserCount | % SAT Click |
|---|---|---|---|---|---|
| microsoft.com | https://www.microsoft.com/ | https://www.microsoft.com/profile.pl | https://en.wikipedia.org/wiki/microsoft/ | 100 | 75% |
| microsoft.com | https://www.microsoft.com/ | https://en.wikipedia.org/wiki/microsoft/ | https://twitter.com/microsoft | 100 | 50% |
| microsoft.com | https://www.microsoft.com/ | https://twitter.com/microsoft | https://en.wikipedia.org/wiki/microsoft/ | 100 | 25% |

At operation 406, satisfaction metrics may be determined. In aspects, a satisfaction metric measures the satisfaction or dissatisfaction of a user with the presented result set. For example, the satisfaction metric may be a 'SAT-click,' which may be obtained when a click on a search result exceeding a threshold dwell time (e.g., 30 seconds) is observed. In examples, the threshold for dwell time may be modified by a client device or automatically by an input processing unit. The input processing unit may modify the dwell time threshold in response to, for example, analyzing the log data. For instance, the input processing unit may analyze the log data to determine an average dwell time of each selected/clicked result. The dwell time threshold may then be changed to correspond to the determined average dwell time. Alternately, the client device may alter the dwell time based on a determination that too many (or too few) result sets are being labeled satisfactory, or based on a shift in dwell time behavior. In another example, the satisfaction metric may be a 'Time to Success' (TTS) score, which may represent the time it takes a client device to select a result that is a SAT-click from the result set. In some aspects, the TTS score may be degraded proportionally to the amount of time it takes a client device to register a SAT-click. In other aspects, the TTS score may be determined using one or more TTS thresholds. For example, a TTS score may record a '1' if a SAT-click is registered in under 10 seconds, a '0.6' if a SAT-click is registered between 10 and 20 seconds, and a '0.3' if a SAT-click is registered in over 20 seconds. In yet another example, the satisfaction metric may be a 'DSAT' signal, which may be obtained when a click on a search result does not exceed a predefined dwell time (e.g., 30 seconds) or when a query is reformulated in response to generating/presenting a result list.

In some aspects, determining satisfaction metrics comprises aggregating the query data into unique result sets. For example, of the 250 "facebook.com" entries discussed above: Result 1 may comprise 150 entries having 100 SAT-clicks, Result 2 may comprise 95 entries having 15 SAT-clicks, and Result 3 may comprise 5 entries having 4 SAT-clicks. Such data may be used to generate another aggregated satisfaction metric, such as % SATClick. In a particular example, % SATClick may represent the percentage of results where a SAT-click was recorded. That is, % SATClick=(Number of documents in the search result list with dwell time clicks higher than 30 seconds)/(Number of documents in search result list). Therefore, % SATClick for Result 1 is 66.7%, % SATClick for Result 2 is 15.8%, and % SATClick for Result 3 is 80%. In another example, % SATClick may be calculated using an approach that assumes that highly relevant documents with long dwell times (e.g., greater than 30 seconds) appearing lower in the search list should be penalized as the graded relevance value is reduced logarithmically proportional to the position of the result in the result list.

Figure 5:
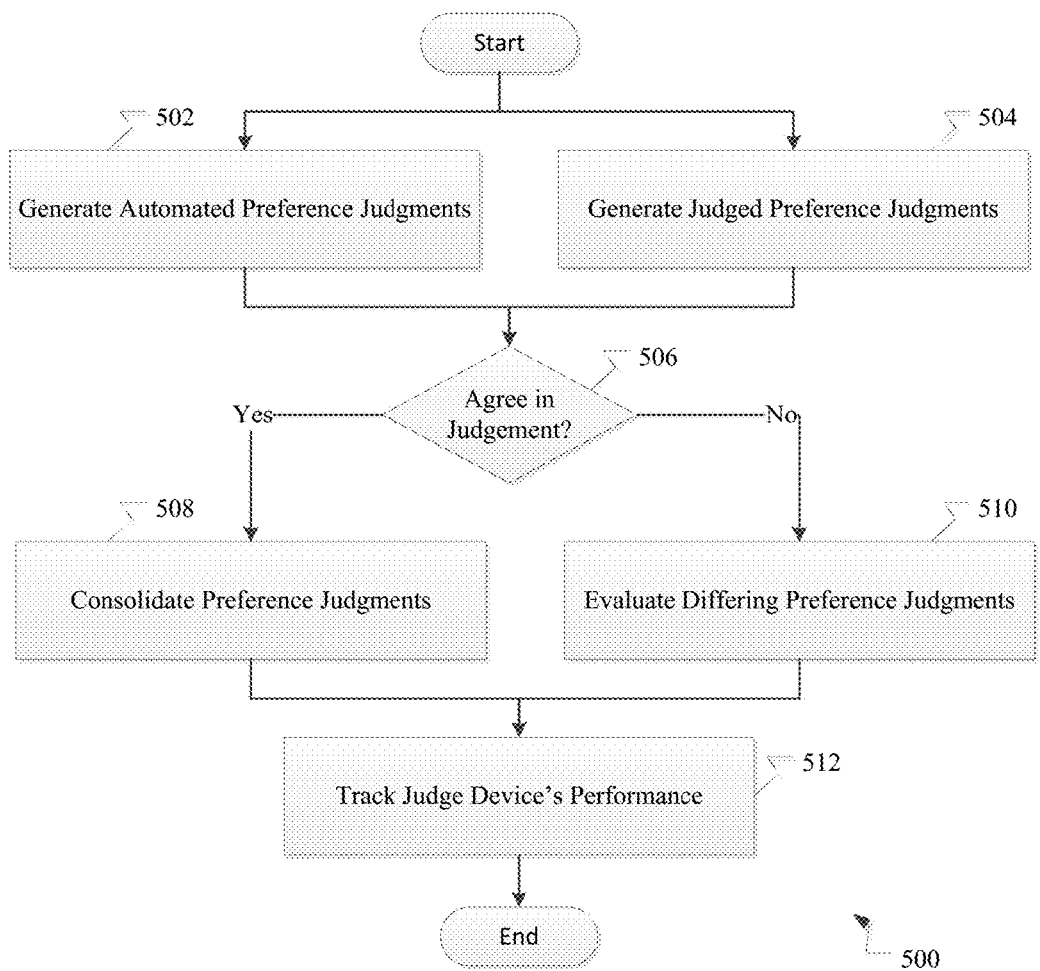
FIG. 5 illustrates an example method of generating automated preference judgments as described herein.

FIG. 5 illustrates an example method 500 of generating automated preference judgments as described herein. At operation 502, the satisfaction metrics generated for queries and result sets described in FIG. 4 may be used to generate automated preference judgments. In aspects, an input processing device may analyze the satisfaction metrics generated for one or more queries. In examples, the analysis may include comparing the satisfaction metrics for the result sets of each query, and determining a most and/or least satisfying result set (e.g., generating an automated preference judgment). In a particular example, the % SATClick values for each result set (or result set group) for a query may be compared, such that the result set (or result set group) having the highest % SATClick is determined to be the most relevant and/or most satisfying among the result sets (or result set groups) for the query. In another example, the % SATClick values for each result set (or result set group) for a query may be compared, such that ordered automated preference judgments are generated for any result set (or result set group) above a threshold. That is, result sets above a threshold may be ranked from most to least preferred.

In some aspects, the input processing device may attempt to verify the automated preference judgment(s). For example, the input processing device may verify that the difference in the satisfaction metrics between the analyzed result sets is statistically significant. In some examples, two-sample t-tests may be used for verification. The two-sample t-tests may be used to determine whether the difference between the % SATClick values for two or more result sets is greater that a threshold value (e.g., 2%). If the difference is greater than the threshold value, the automated preference judgment may be considered verified and/or may be transformed into a set of verified automated preference judgments. If the difference is equal to or less than the threshold value, the preference judgment may be eliminated or a value associated with the strength (e.g., the probability of correctness) of the automated preference judgment may be decremented accordingly.

At operation 504, the satisfaction metrics generated for queries and result sets described in FIG. 4 may be used to generate judged preference judgments. In aspects, the satisfaction metrics and log data associated with a query may be transmitted or otherwise made accessible to a judge device. The judge device may analyze the available information to determine a most satisfying and/or relevant result set (or result set group) for a query. In examples, the analysis may include comparing the one or more metrics for the result sets of each query, and determining a most satisfying and/or relevant result set (e.g., generating a judged preference judgment). In a particular example, the aggregated satisfaction metrics (e.g., % SATClick values) for each result set (or result set group) for a query may be compared, such that the result set (or result set group) having the highest aggregated satisfaction metrics is determined to be the most relevant and/or most satisfying among the result sets (or result set groups) for the query.

In some aspects, a judge device may determine a confidence level for a generated preference judgment. In examples, a judge device may determine a high confidence level to the preference of a result set group when the satisfaction metric for the result set group greatly exceeds the satisfaction metric for all other result set groups for a query. In a particular example, a judge device may determine a high confidence level to a preference to a "query A" result group having a % SATClick of 90% when the next highest % SATClick for a "query A" result group is 25%. In other examples, a judge device may assign a low confidence level to a preference to a result set group when the satisfaction metric for the result set group does not greatly exceed the satisfaction metric for the result set groups having the next highest satisfaction metric. For example, a judge device may assign a low confidence level to a preference to a "query B" result group having a % SATClick of 40% when the next highest % SATClick for a "query B" result group is 39%. Alternately, a judge device may assign a low confidence level to a preference to a result set group when the count for one or more of the compared result set groups does not exceed a threshold value. For example, a judge device may assign a low (or no) confidence level to a preference to a "query C" result group having 10 entries and a % SATClick of 90% where the next highest result group for "query C" has 8 entries and a % SATClick of 25%. In such an example, the threshold value for a result group to receive a high confidence level may be set to 25 entries.

At decision operator 506, the generated automated preference judgment and generated judged preference judgments may be compared. In examples, the comparing may include analyzing the similarities between an ordered list of preferences from the respective preference judgments (e.g., automated preference judgments and judged preference judgments), where the order of the ordered list is based on preference. In other examples, the comparing may include analyzing an indicator (e.g., a number) associated with a result set (or result set group) for a query, where the indicator indicates the preference order of the result set (or result set group). In a particular example, the indicator may be generated by an algorithm or statistical model associated with the input processing device. For instance, the output of operations 502 and 504 may include at least one or more result set groups, where the result set groups are assigned a numerical ranking to indicate the preference order of the result set group among all of the result set groups associated with a query. In yet other examples, the comparing may include analyzing an identified preferred result set (or result set group) from the respective preference judgments for each query.

In aspects, if the comparison determines that the automated preference judgments and judged preference judgments are the same or are substantially consistent, method 500 may proceed to operation 508. In examples, the compared preference judgments may be determined to be the same or substantially consistent if a number of matches between the automated preference judgments and judged preference judgments exceeds a threshold value. In a particular example, the compared preference judgments may be determined to be substantially consistent when greater than 95% of the preferred result groups are the same between the automated preference judgment and judged preference judgments. If the comparison determines that the automated preference judgments and judged preference judgments are not the same or are not substantially consistent, method 500 may proceed to operation 510. In some aspects, the threshold value may be determined by the input processing device by evaluating data (e.g., historical preference data, log data, a judge device tracking log) using an algorithm or statistical model. For example, a statistical model may use such data as inputs to generate a threshold value that reasonably anticipates a percentage of matches that result in a reliable set of preference judgments. In other aspects, the threshold value may be determined by a client device, based on trending data, perceptive analysis and/or a statistical model as described above.

At operation 508, the preference judgments may be consolidated. In aspects, the automated preference judgments and judged preference judgments may be consolidated and/or finalized into a set of approved preference judgments. The approved preference judgments may be used to train a statistical model, used as inputs for an algorithm, stored in data storage, provided to a client device, used to modify one or more applications or computer components, etc. For example, the approved preference judgments may be used as inputs to a statistical model that may be trained to automatically provide preference judgments over two or more lists without requiring human judgment. In some aspects, the approved preference judgments may comprise only the preference judgments that were the same between the automated preference judgments and judged preference judgments. The preference judgments that were not the same may be omitted from the approved preference judgments. In other aspects, the approved preference judgments may comprise the preference judgments that were the same between the automated preference judgments and judged preference judgments and a selection from one or more of the automated preference judgments and judged preference judgments of the preference judgments that were not the same. For example, the approved preference judgments may comprise the matching preferences judgments between the automated preference judgments and judged preference judgments and the unmatched preference judgments from the automated preference judgments. In such an example, automated preference judgments may be determined to be more reliable than judged preference judgments; thus, any inconsistencies in the matching process may be resolved in favor of the automated preference judgments. Method 500 may then proceed to operation 512.

At operation 510, the preference judgments may be evaluated by a s conflict resolution device. In aspects, a conflict resolution device may analyze the judged preference judgments and the automated preference judgments to resolve inconsistencies between the two sets of preference judgments or to provide a third set of preference judgments. For example, a conflict resolution device may access and analyze/compare the judged preference judgments and the automated preference judgments to determine which of the preference judgments is most accurate and/or relevant to the query. In some aspects, a set of resolved preference judgments may be determined by the conflict resolution device. In an example, the conflict resolution device may simply select between the judged preference judgments and the automated preference judgments. The selected list may be consolidated as resolved preference judgments. In another example, the conflict resolution device may select the most accurate result set (or result set group) for each query from the two sets of preference judgments. The selected result sets may be transformed and/or consolidated into a set of resolved preference judgments. In yet another example, the conflict resolution device may additionally or alternately access the satisfaction metrics generated for the queries and result sets described in FIG. 4. Using the satisfaction metrics, the conflict resolution device may generate an independent set of resolved preference judgments. The resolved preference judgments may supersede the judged preference judgments and the automated preference judgments. Alternately, the resolved preference judgments may be used in such way that any inconsistencies between the resolved preference judgments and the judged preference judgments and/or the automated preference judgments is resolved in favor of the resolved preference judgments.

At operation 512, the performance of a judge device may be tracked. In aspects, data associated with the judge device, the judged preference judgments, and/or input from the conflict resolution device may be aggregated or tracked. For example, an input processing device may gather and store data, such as the number or percentage of matches between the judged preference judgments and the automated preference judgments, the number or percentage of matches between the judged preference judgments and the resolved preference judgments, the amount of time required to generate the judged preference judgments, and the confidence level of the judged preference judgments. The aggregated/tracked information may be used to, for example, monitor judge devices, determine the quality and/or efficiency of judge devices, determine the quality of the automated preference judgments, detect spammers (e.g., judge devices that receive and/or provide intentionally low-quality judgments or inadequate analysis when generating preferences), and assess the costs associated with SBS evaluation.

Figure 6:
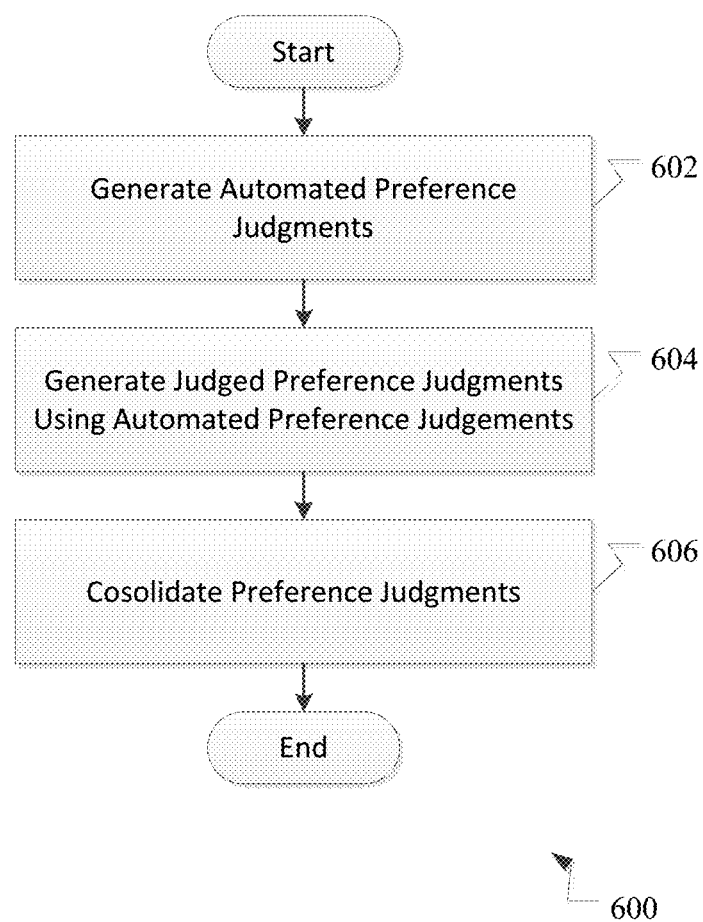
FIG. 6 illustrates an alternate example method of generating automated preference judgments as described herein.

FIG. 6 illustrates an alternate example method 600 of generating automated preference judgments as described herein. At operation 602, the satisfaction metrics generated for queries and result may be used to generate automated preference judgments, as described above with respect to FIG. 5. For example, an input processing device may analyze/compare the satisfaction metrics for the result sets of each query and determine a most and/or least satisfying/relevant result set; thus, generating an automated preference judgment.

At operation 604, the satisfaction metrics generated for queries and result sets may be used by a judge device to generate judged preference judgments, as described with respect to FIG. 5. Additionally, the automated preference judgments may be transmitted or otherwise made accessible to the judge device. In aspects, a judge device may analyze the available information (e.g., satisfaction metrics, result sets, automated preference judgments, etc.) to determine a most satisfying and/or relevant result set (or result set group) for a query. In such aspects, the judge device may use the available information in conjunction with heuristics, statistical models, one or more algorithms, and/or human input. In examples, the analyzing may include receiving "hints" (e.g., feedback) from the automated preference judgments as a judge device generates preference judgments for one or more queries. In a particular example, a hint may include revealing the automated preference judgments selected for the query after a threshold time period (e.g., 20 seconds) has elapsed during the judge device's analysis. In another example, a hint may be revealed after the judge device has generated a preference judgment for a query that is inconsistent with the preference for the query in the automated preference judgments. In yet another example, a hint may be revealed before the judge device has generated a preference judgment. In still other examples, the hint may include one or more of the factors used to determine the preference in the automated preference judgments, instead of simply revealing the generated preference. In such examples, such hints may expedite and/or increase the accuracy of the judged preference judgments.

At operation 606, preference judgments may be consolidated. In aspects, the automated preference judgments and judged preference judgments may be consolidated and/or finalized into a set of feedback-assisted preference judgments. In some aspects, the feedback-assisted preference judgments may comprise only the judged preference judgments. In other aspects, the feedback-assisted preference judgments may comprise the judged preference judgments, one or more of the automated preference judgments and the hints/feedback provided to the judge device. In yet other aspects, the feedback-assisted preference judgments may comprise the automated preference judgments and on or more indications of the preferences that matched between the automated preference judgments and the judged preference judgments. In aspects, the judge device's judgments and/or performance may be tracked, as described with respect to FIG. 5.

Figure 7:
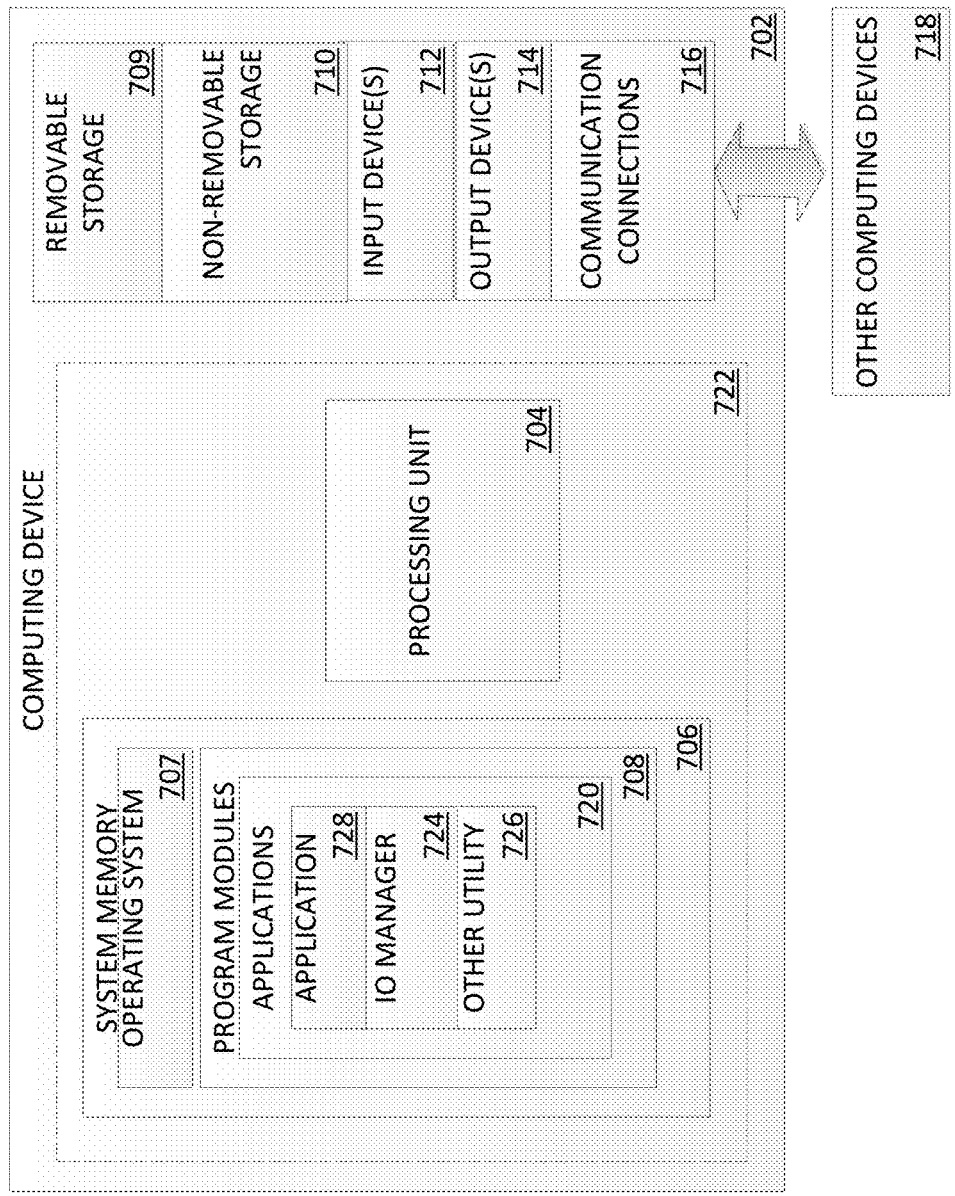
FIG. 7 is a block diagram illustrating an example of a computing device with which aspects of the present disclosure may be practiced.
Figure 8A:
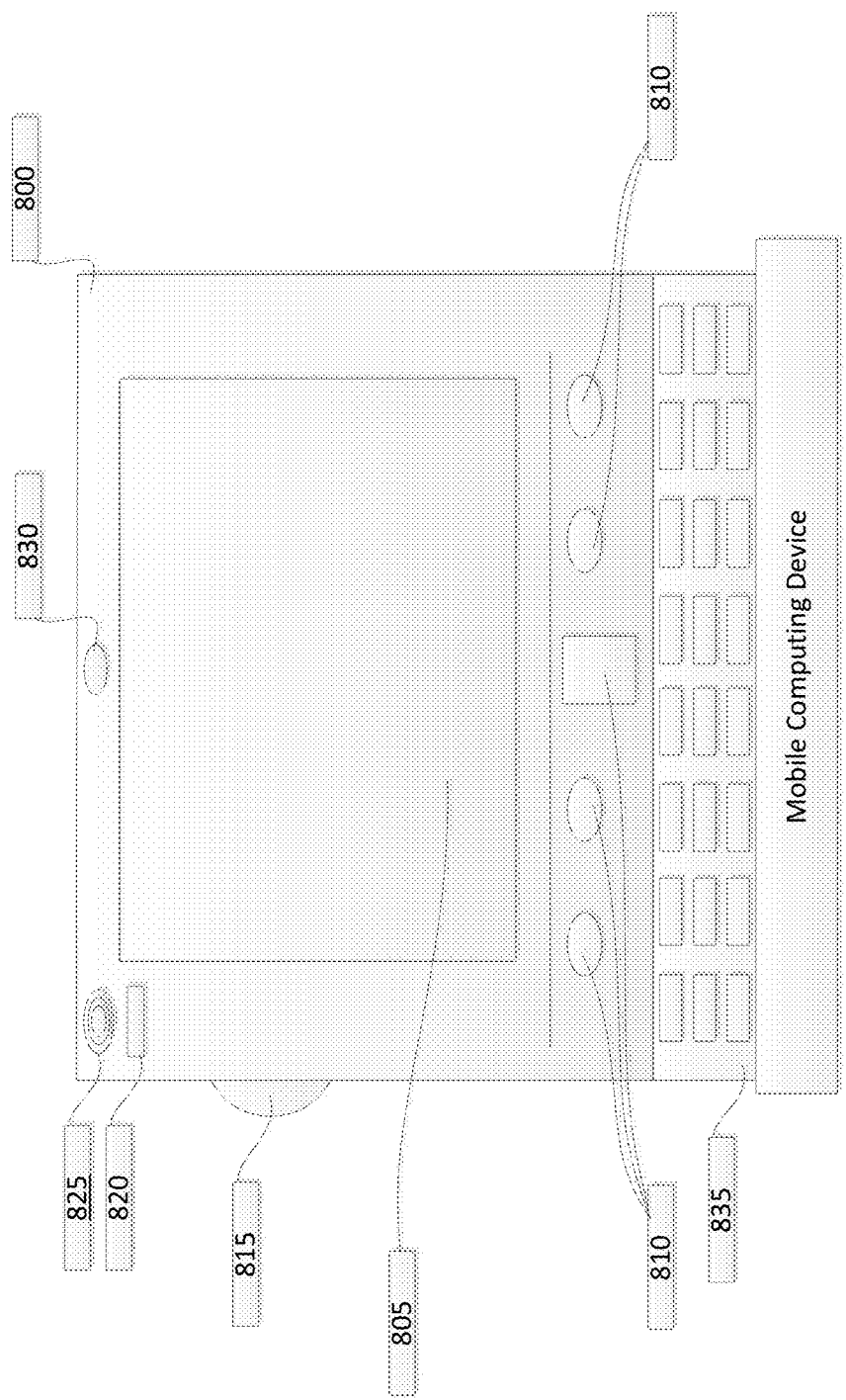
FIGS. 8A and 8B are simplified block diagrams of a mobile computing device with which aspects of the present disclosure may be practiced.
Figure 8B:
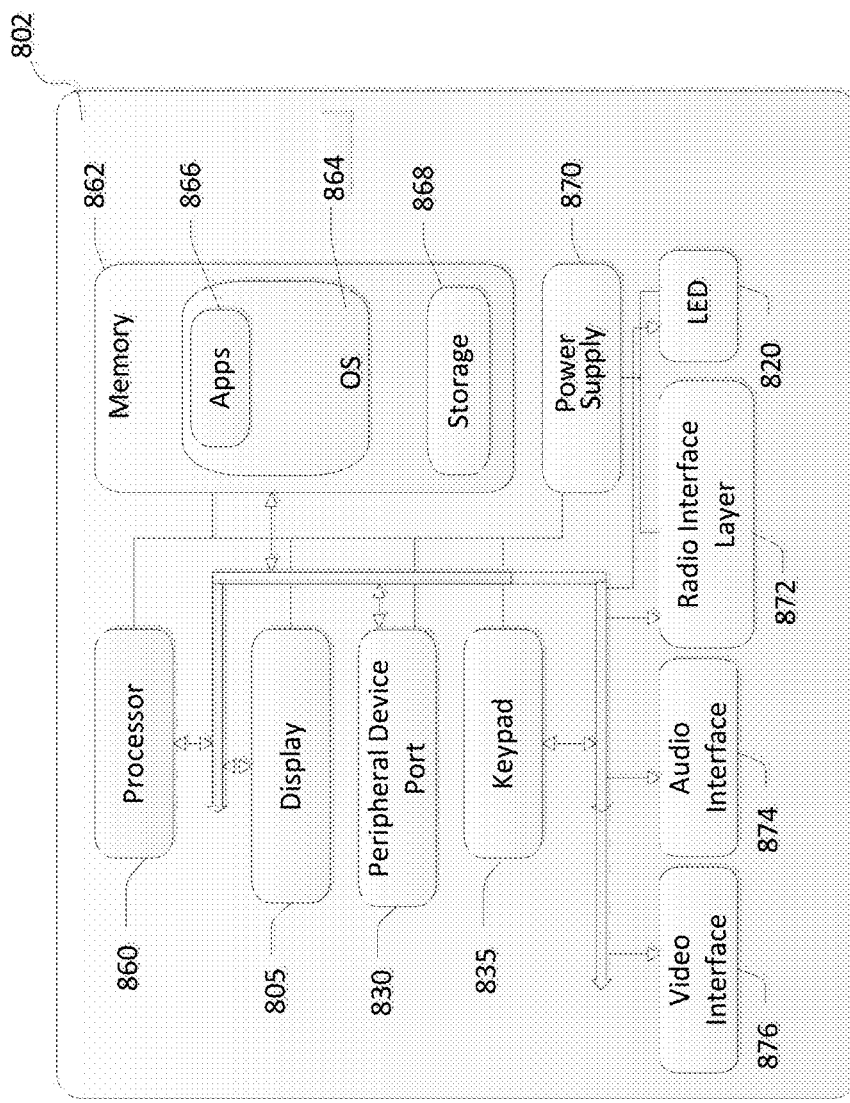
Figure 9:
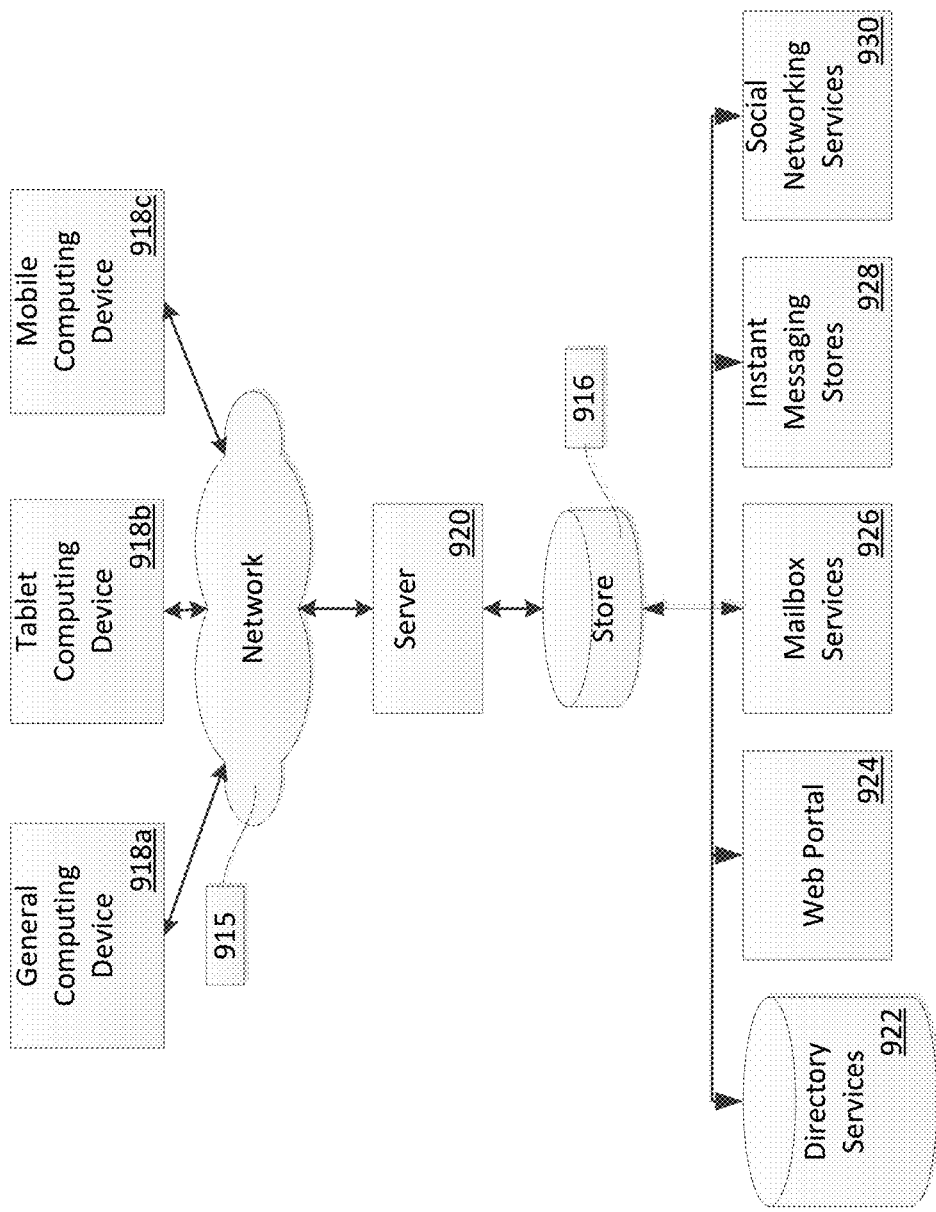
FIG. 9 is a simplified block diagram of a distributed computing system in which aspects of the present disclosure may be practiced.

FIGS. 7-9 and the associated descriptions provide a discussion of a variety of operating environments in which examples of the invention may be practiced. However, the devices and systems illustrated and discussed with respect to FIGS. 7-9 are for purposes of example and illustration and are not limiting of a vast number of computing device configurations that may be utilized for practicing examples of the invention, described herein.

FIG. 7 is a block diagram illustrating physical components of a computing device 702, for example a component of a system with which examples of the present disclosure may be practiced. The computing device components described below may be suitable for the computing devices described above. In a basic configuration, the computing device 702 may include at least one processing unit 704 and a system memory 706. Depending on the configuration and type of computing device, the system memory 706 may comprise, but is not limited to, volatile storage (e.g., random access memory), non-volatile storage (e.g., read-only memory), flash memory, or any combination of such memories. The system memory 706 may include an operating system 707 and one or more program modules 708 suitable for running software applications 720 such as application 728, IO manager 724, and other utility 726. As examples, system memory 706 may store instructions for execution. Other examples of system memory 706 may be components such as a knowledge resource or learned program pool, as examples. The operating system 707, for example, may be suitable for controlling the operation of the computing device 702. Furthermore, examples of the invention may be practiced in conjunction with a graphics library, other operating systems, or any other application program and is not limited to any particular application or system. This basic configuration is illustrated in FIG. 7 by those components within a dashed line 722. The computing device 702 may have additional features or functionality. For example, the computing device 702 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 706. While executing on the processing unit 704, the program modules 708 (e.g., application 728, Input/Output (I/O) manager 724, and other utility 726) may perform processes including, but not limited to, one or more of the stages of the operational method 300 illustrated in FIG. 3, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 702 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 702 may also have one or more input device(s) 712 such as a keyboard, a mouse, a pen, a sound input device, a device for voice input/recognition, a touch input device, etc. The output device(s) 714 such as a display, speakers, a printer, etc. may also be included. The aforementioned devices are examples and others may be used. The computing device 704 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 706, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 702. Any such computer storage media may be part of the computing device 702. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a personal data assistant, a tablet personal computer, a laptop computer, and the like, with which examples of the invention may be practiced. For example, mobile computing device 800 may be implemented as system 100, components of systems 100 may be configured to execute processing methods as described in FIG. 3, among other examples. With reference to FIG. 8A, one example of a mobile computing device 800 for implementing the examples is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display. In various examples, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (i.e., an architecture) 802 to implement some examples. In examples, the system 802 is implemented as a "smart phone" capable of running one or more applications (e.g., browser, e-mail, input processing, calendaring, contact managers, messaging clients, games, and media clients/players). In some examples, the system 802 is integrated as a computing device, such as an integrated personal digital assistant (PDA) and wireless phone.

One or more application programs 866 may be loaded into the memory 8682 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 8682. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 8682 and run on the mobile computing device 800, including application 728, IO manager 724, and other utility 726 described herein.

The system 802 has a power supply 870, which may be implemented as one or more batteries. The power supply 870 might further include an external power source, such as an AC adapter or a powered docking cradle that supplements or recharges the batteries.

The system 802 may include peripheral device port 878 that performs the function of facilitating connectivity between system 802 and one or more peripheral devices. Transmissions to and from the peripheral device port 872 are conducted under control of the operating system 864. In other words, communications received by the peripheral device port 878 may be disseminated to the application programs 866 via the operating system 864, and vice versa.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with examples of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one example of the architecture of a system for providing an application that reliably accesses target data on a storage system and handles communication failures to one or more client devices, as described above. Target data accessed, interacted with, or edited in association with application 728, IO manager 724, other utility 726, and storage may be stored in different communication channels or other storage types. For example, various documents may be stored using a directory service 922, a web portal 924, a mailbox service 926, an instant messaging store 928, or a social networking site 930, application 728, IO manager 724, other utility 726, and storage systems may use any of these types of systems or the like for enabling data utilization, as described herein. A server 920 may provide storage system for use by a client operating on general computing device 702 and mobile device(s) 800 through network 915. By way of example, network 915 may comprise the Internet or any other type of local or wide area network, and client nodes may be implemented as a computing device 702 embodied in a personal computer, a tablet computing device, and/or by a mobile computing device 800 (e.g., a smart phone). Any of these examples of the client computing device 702 or 800 may obtain content from the store 916.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A system comprising:
   at least one processor; and
   memory coupled to the at least one processor, the memory comprising computer executable instructions that, when executed by the at least one processor, performs a method comprising:
      receiving a first selection, wherein the first selection is associated with first query data;
      receiving a second selection, wherein the second selection is associated with second query data;

processing the first query data and the second query data, wherein the processing comprises generating a first satisfaction value for the first query data and a second satisfaction value for the second query data;
generating a first preference judgment for at least one of the first query data and the second query data based upon a comparison, by the system, of the first satisfaction value to the second satisfaction value;
generating a second preference judgment for at least one of the first query data and the second query data based upon a comparison, by a judge, of the first satisfaction value to the second satisfaction value;
determining whether the first preference judgment matches the second preference judgment; and
when the first preference judgment matches the second preference judgment, generating an approved preference judgment.

2. The system of claim 1, wherein processing the first and second query data comprises:
receiving the first query data from a first computing device;
retrieving a first result set;
logging the first query data and the first result set to a query log;
receiving the second query data from a second computing device;
retrieving a second result set; and
logging the second query data and the second result set to a query log.

3. The system of claim 2, wherein the first query data comprises a first query and first session information and the second query data comprises a second query and second session information, wherein the first session information comprises at least first satisfaction data, and wherein the second session information comprises at least second satisfaction data.

4. The system of claim 3, wherein the first query data further comprises first identifying information from the first computing device and the second query data further comprises second identifying information from the second computing device, wherein the first identifying information comprises at least one of: a first username, a first device IP address and a first device MAC address, and wherein the second identifying information comprises at least one of: a second username, a second device IP address and a second device MAC address.

5. The system of claim 3, wherein the first query and the second query include the same terms or substantially similar terms.

6. The system of claim 3, further comprising:
evaluating first log data associated with the first query data, wherein evaluating first log data comprises identifying the first result set and the first satisfaction data in the query log; and
evaluating second log data associated with the second query data, wherein evaluating second log data comprises identifying the second result set and the second satisfaction data in the query log.

7. The system of claim 3, wherein the first satisfaction data comprises a first dwell time, and wherein the first dwell time is associated with the amount of time a user spent on a clicked result in the first result set.

8. The system of claim 7, wherein determining a first satisfaction value comprises using the first dwell time to calculate the satisfaction of the user with the clicked result.

9. The system of claim 1, wherein generating the first preference judgment comprises:
comparing, by the system, the first satisfaction value to the second satisfaction value to generate an automated judgment.

10. The system of claim 9, wherein generating the first preference judgment further comprises:
analyzing, by a judge, at least the first satisfaction value to the second satisfaction value to generate a second preference judgment.

11. The system of claim 10, wherein generating the first preference judgment further comprises:
determining whether the automated judgment matches the second preference judgment;
when the automated judgment matches the second preference judgment, transforming the automated judgment and the second preference judgment into an approved preference judgment; and
when the automated judgment does not match the second preference judgment, transforming the automated judgment and the second preference judgment into a third preference judgment.

12. The system of claim 11, further comprising:
tracking the performance of the judge using at least the second preference judgment.

13. The system of claim 10, wherein generating the first preference judgment further comprises:
providing the automated judgment to the judge;
analyzing, by the judge, the automated judgment to generate the second preference judgment; and
transforming the second preference judgment into the first preference judgment.

14. A system comprising:
at least one processor; and
memory coupled to the at least one processor, the memory comprising computer executable instructions that, when executed by the at least one processor, performs a method comprising:
receiving a plurality of selections, wherein the plurality of selection are associated with a set of query data;
processing the set of query data to generate satisfaction data for the set of query data;
based at least on the plurality of selections, generating one or more result sets and satisfaction data for the plurality of queries;
generating a first preference judgment for the set of query data based upon a comparison, by the system, of the satisfaction data;
generating a second preference judgment for set of query data based upon a comparison, by a judge, of the satisfaction data
determining whether the first preference judgment matches the second preference judgment; and
when the first preference judgment matches the second preference judgment, generating an approved preference judgment.

15. The system of claim 14, wherein the query data further comprises session information and identifying information, wherein the session information comprises at least first satisfaction data and the identifying information comprises at least one of: a username, a device IP address and a device MAC address.

16. The system of claim 14, wherein satisfaction data comprises at least a dwell time, the dwell time being associated with an amount of time a user spent on a clicked result in the one or more result set, and wherein determining satisfaction value comprises using the dwell time to calculate the satisfaction of the user with the clicked result.

17. The system of claim 14, wherein generating the one or more preference judgments comprises:
- comparing, by the system, the aggregated satisfaction data for each result group;
- selecting a largest satisfaction value in the aggregated satisfaction data for each result group; and
- based on the aggregated satisfaction data, generating an automated judgment for each result group.

18. The system of claim 17, wherein generating the one or more preference judgments further comprises:
- comparing, by a judge, the aggregated satisfaction data for each result group;
- selecting a largest satisfaction value in the aggregated satisfaction data for each result group; and
- based on the aggregated satisfaction data, generating a first judgment for each result group.

19. The system of claim 17, further comprising:
- identifying a pair of result sets in one or more result groups, the pair of result sets having significantly different satisfaction values in the aggregated satisfaction data;
- identifying a count for the result sets in the pair of result sets; and
- comparing the count for the result sets; and
- based on the comparison, modifying the preference judgment.

20. A computer-implemented method for improving judgment quality, the method comprising:
- receiving a first query data from a first computing device, wherein the first query data comprises a first query and first session information, the first session information comprising first satisfaction data;
- retrieving a first result set using the first query;
- logging the first query data and the first result set to a query log;
- receiving a second query data from a second computing device, wherein the second query data comprises a second query and second session information, the second session information comprising second satisfaction data;
- retrieving a second result set using the second query;
- logging the second query data and the second result set to a query log;
- evaluating first log data associated with the first query data, wherein evaluating the first log data comprises determining a first satisfaction value for the first log data;
- evaluating second log data associated with the second query data, wherein evaluating the second log data comprises determining a second satisfaction value for the second log;
- generating a first preference judgment based upon a comparison, by an evaluation system associated with the first computing device, of the first satisfaction value to the second satisfaction value;
- generating a second preference judgment based upon a comparison, by a judge, of the first satisfaction value to the second satisfaction value;
- determining whether the first preference judgment matches the second preference judgment and
- when the first preference judgment matches the second preference judgment, generating an approved preference judgment.

* * * * *